US010402840B2

(12) United States Patent
Tibau-Puig et al.

(10) Patent No.: US 10,402,840 B2
(45) Date of Patent: Sep. 3, 2019

(54) SYSTEMS AND METHODS FOR SETTING PRODUCT PRICES

(71) Applicant: Wal-Mart Stores, Inc., Bentonville, AR (US)

(72) Inventors: Arnau Tibau-Puig, San Francisco, CA (US); Laurent El Ghaoui, Berkeley, CA (US); Nipun Bhatia, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 489 days.

(21) Appl. No.: 14/502,207

(22) Filed: Sep. 30, 2014

(65) Prior Publication Data

US 2015/0363805 A1    Dec. 17, 2015

Related U.S. Application Data

(60) Provisional application No. 62/012,180, filed on Jun. 13, 2014.

(51) Int. Cl.
*G06Q 30/02* (2012.01)

(52) U.S. Cl.
CPC .................. *G06Q 30/0206* (2013.01)

(58) Field of Classification Search
CPC .................................................. G06Q 30/0206
USPC ........................................................ 705/7.35
See application file for complete search history.

(56) References Cited

U.S. PATENT DOCUMENTS

| 4,562,552 A * | 12/1985 | Miyaoka | E03B 7/02 |
| | | | 137/255 |
| 2002/0116348 A1 * | 8/2002 | Phillips | G06Q 30/02 |
| | | | 705/400 |
| 2005/0197896 A1 * | 9/2005 | Veit | G06Q 10/087 |
| | | | 705/14.49 |

(Continued)

OTHER PUBLICATIONS

Aharon Ben-Tal, Laurent El Ghaoui, and Arkadi Nemirovski. Robust optimization. Princeton University Press, 2009.*

(Continued)

*Primary Examiner* — Christine M Behncke
*Assistant Examiner* — Shelby A Turner
(74) *Attorney, Agent, or Firm* — Bryan Cave Leighton Paisner LLP

(57) ABSTRACT

A dynamic pricing algorithm is used to price a large set of items so that their aggregate margin is above a pre-specified level even under uncertain demand. The algorithm automatically hedges the profit loss associated to low-margin items with profit gains associated to higher-margin items, and does so even when the realized demand is different than the expected one. The algorithm leverages the separability of a re-formulation of the robust counterpart of the nominal revenue maximization problem. This separability results into a nested bisection algorithm where each iteration in the procedure requires only computation of a number of independent, one-dimensional optimization problems, one for each product to price. The algorithm is easily implemented in a parallel architecture such a multi-core computer or a cluster of computers, where each core handles an independent one-dimensional problem corresponding to an item and its data is stored locally.

18 Claims, 4 Drawing Sheets

(56) References Cited

U.S. PATENT DOCUMENTS

2008/0059280 A1* 3/2008 Tellefsen ............... G06Q 30/02
 705/7.31
2009/0327037 A1* 12/2009 Ng ..................... G06Q 30/0244
 705/14.43

OTHER PUBLICATIONS

Dimitris Bertsimas and Georgia Perakis. Dynamic pricing: A learning approach. Springer, 2006.*
Omar Besbes and Assaf Zeevi. Dynamic pricing without knowing the demand function: Risk bounds and near-optimal algorithms. Operations Research, 57(6):1407-1420, 2009.*
Gabriel Bitran and Rene Caldentey. An overview of pricing models for revenue management. Manufacturing & Service Operations Management, 5(3):203-229, 2003.*
Guillermo Gallego and Garrett Van Ryzin. Optimal dynamic pricing of inventories with stochastic demand over finite horizons. Management science, 40(8):999-1020, 1994.*
Miguel Sousa Lobo and Stephen Boyd. Pricing and learning with uncertain demand. Preprint, Fuqua School of Business, Duke University, 2003.*
Jeffrey O. Kephart, James E. Hanson, and Amy R. Greenwald. Dynamic pricing by software agents. Computer Networks 32 (2000) 731-752.*
Jianmai Shi and Guoqing Zhang. Multi-product budget-constrained acquisition and pricing with uncertain demand and supplier quantity discounts. Int. J. Production Economics 128 (2010) 322-331.*
Yifan Xu and Xiuli Chao. Control for a Production System with Average Profit Criterion. Probability in the Engineering and Informational Sciences 23 (2009) 489-513.*
Blake et al., "A Survey of Multicore Processors", Nov. 2009, IEEE Signal Processing Magazine https://ieeexplore.ieee.org/stamp/stamp.jsp?arnumber=5230801 (Year: 2009).*
Pawel Gepner and Michal F. Kowalik, "Multi-Core Processors: New Way to Achieve High System Performance", 2006, IEEE Proceedings of the International Symposium on Parallel Computing in Electrical Engineering (Year: 2006).*
Anna Nagurney and Dae-Shik Kim, "Parallel Computation of Large-Scale Dynamic Market Network Equilibria via Time Period Decomposition", Mathematical and Computer Modelling vol. 15, No. 6, pp. 55-67, 1991 (Year: 1991).*
Dimitri P. Bertsekas and John N. Tsitsiklis "Parallel and Distributed Computation: Numerical Methods", Athena Scientific, 1997, originally published 1989 (Year: 1997).*
D.K. Tasoulis, N.G. Pavlidis, V.P. Plagianakos, and M.N. Vrahatis "Parallel Differential Evolution", IEEE Proceedings of the 2004 Congress on Evolutionary Computation, 2004 https://ieeexplore.ieee.org/document/1331145/ (Year: 2004).*
TechTerms.com "Multi-Core", http://www.techterms.com/definition/nnulti-core, Oct. 14, 2013 accessed via archive.org (Year: 2013).*
Goker Aydin and Evan L. Porteus. Joint Inventory and Pricing Decisions for an Assortment. Operations Research, 56(5): 1247-1255. 2008.*
Vivek F. Farias and Benjamin Van Roy. Dynamic Pricing with a Prior on Market Response. 2009. http://web.mit.edu/vivekf/www/papers/FariasVanRoy08Online.pdf.*
Anton J. Kleywegt. An Optimal Control Problem of Dynamic Pricing. 2001. http://www2.isye.gatech.edu/people/faculty/Anton_Kleywegt/OptControl.pdf.*
Gabriel Bitran, Rene Caldentey, and Susana Mondschein, "Coordinating Clearance Markdown Sales of Seasonal Products in Retail Chains," Operations Research, vol. 46, No. 5, pp. 609-624, Sep.-Oct. 1998.
Wedad Elmaghraby and Pinar Keskinocak, "Dynamic Pricing in the Presence of Inventory Considerations: Research Overview, Current Practices, and Future Directions," Management Science, vol. 49, No. 10, pp. 1287-1309, Oct. 2003.
Wilfred M Kincaid, and Donald A Darling, "An Inventory Pricing Problem," Journal of Mathematical Analysis and Applications, vol. 7, No. 2, pp. 183-208, 1963.
Anshul Sood, "Competitive Multi-Period Pricing for Perishable Products," PhD Thesis, Massachusetts Institute of Technology, 2004.

* cited by examiner

SYSTEMS AND METHODS FOR SETTING PRODUCT PRICES

RELATED APPLICATIONS

This application claims the benefit of U.S. Provisional Application Ser. No. 62/012,180, filed Jun. 13, 2014, and entitled Scalable and Robust Dynamic Pricing for Margin-Constrained Revenue Management, which is hereby incorporated herein by reference in its entirety.

FIELD OF THE INVENTION

This invention relates to a computationally efficient system and method for setting prices for products in order to maximize revenue and meeting one or more other constraints.

BACKGROUND OF THE INVENTION

Traditional dynamic pricing addresses the problem of finding a pricing policy that maximizes a function of the revenue (typically, its expected value) under inventory constraints. Depending on the assumptions regarding the demand model and one's knowledge about it, the pricing policy then will seek to set prices so that the seller sells the right amount of units at the right time, at least as far as revenue maximization is concerned. This understanding of dynamic pricing, also known as "revenue management," is motivated by the problems in the airline and hotel industry that initiated this field of research and is typically concerned with the following setting: a seller wants to price a fixed total capacity C of a perishable (i.e. a resource that is not depleted over time [see reference 6]), such as seats in an airplane, and a price-sensitive demand $D_t(P_t)$, where $P_t$ denotes the price of the resource at time t and t ranges from 0 to the time horizon H (e.g. the moment the corresponding airport check-in counter closes). The problem of revenue management is then stated as that of selecting an offering policy, denoted by the tuple $\{(q_t, p_t)\}_t$ of units offered and price points over a horizon so that the cumulative revenue is maximized while making sure that the available capacity is exhausted at t=H [see references 4 and 6]. In many applications, it is assumed that $q_t = D_t(p_t)$ so the decision variables are only the prices $\{p_t\}_t$.

The systems and methods disclosed herein provide a computationally efficient method for performing dynamic pricing.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
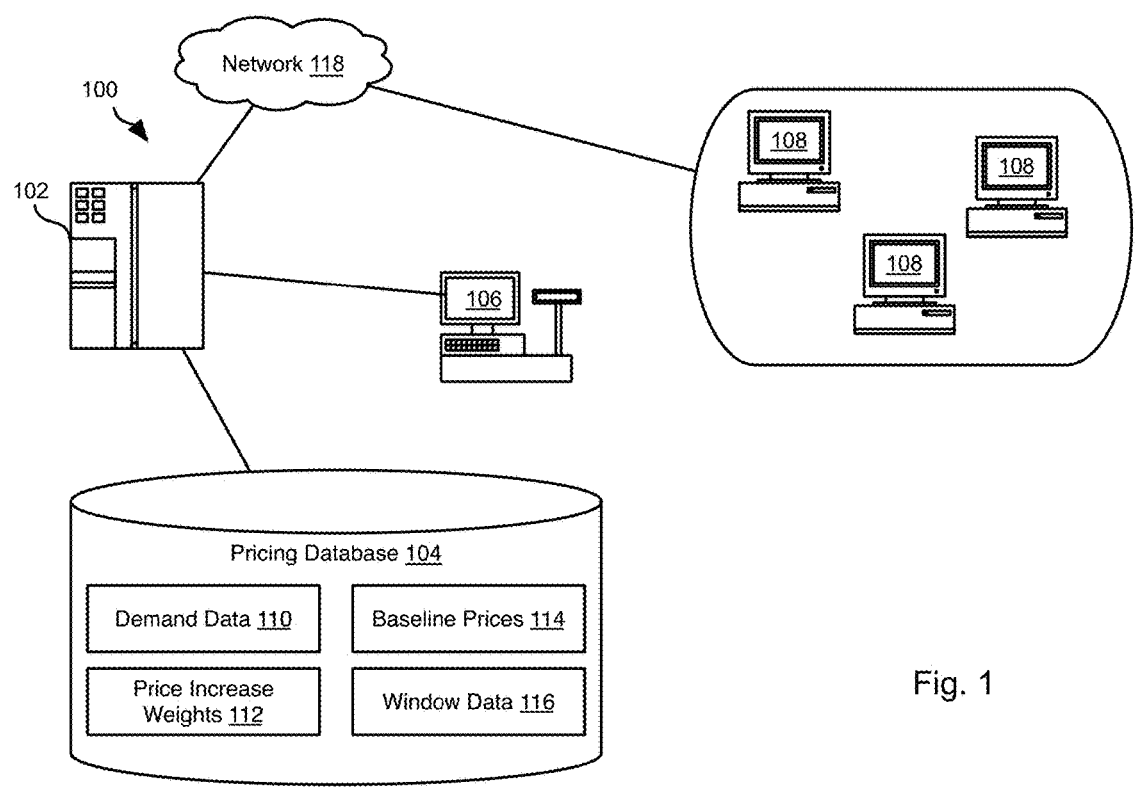
FIG. 1 is a schematic block diagram of a network environment in which methods in accordance with embodiments of the present invention may be performed.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In particular, the problem of pricing a large set of items so that the aggregate gross margin is above a pre-specified level is disclosed. An interval-uncertain separable linear demand model is defined and, under this model, the robust counterpart of the revenue maximization under margin constraint problem is found to be a tractable convex problem. A scalable nested-bisection algorithm is disclosed that is amenable to parallelization and enables the pricing of a very large number of items, a desired feature for on-line retailers with potentially large catalogs.

The algorithm disclosed provides an algorithm to price a large set of items so that their aggregate margin is above a pre-specified level even under uncertain demand. Thus, the algorithm automatically hedges the profit loss associated to low-margin items with profit gains associated to higher-margin items, and does so even when the realized demand is different than the expected one.

The algorithm may advantageously leverage the separability of a re-formulation of the robust counterpart of the nominal revenue maximization problem. This separability results into a nested bisection algorithm where each iteration in the procedure requires only computation of a number of independent, one-dimensional optimization problems, one for each product to price. The algorithm is easily implemented in a parallel architecture such a multi-core computer or a cluster of computers, where each core handles an independent one-dimensional problem corresponding to an item and its data is stored locally.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include a server system 102. The server system 102 may include one or more server computer systems and may be an ecommerce server providing access to a website providing navigation of a product database and conducting electronic transactions for products. The server system 102 may also store and access a product database for a retail store and perform inventor management functions as well as set prices for products offered for sale at one or more retail establishments. In some embodiments, methods for dynamic pricing disclosed herein may be performed by the server system 102. Separate server systems 102 may perform the inventory management and ecommerce functions whereas another server system 102 performs dynamic pricing according to the methods disclosed herein.

The server system 104 may host or access a pricing database 104 storing data for use according to the methods described herein. The server system 104 may also be in data communication with one or more point of sale (POS) 106 located in a retail establishment and may transmit pricing data to the POS 106 and receive transaction records from the POS 106. The server system 102 may also be in data communication with one or more user computing devices 108, which may be embodied as a desktop or laptop computer, tablet computer, smart phone, wearable computing device, or other computing device.

The pricing database 104 may store such information as demand data 110 indicating demand by consumers for a plurality of products, price increase weights 112 each indicating a penalty for price increases on a product, baseline prices 114 indicating offer prices for the plurality of products, and window data 116 that indicates uncertainty in demand for the plurality of products and/or for other data sets 112, 114 for the plurality of products. The definitions of these data sets and the method in which they are used are described in greater detail below.

Figure 2:
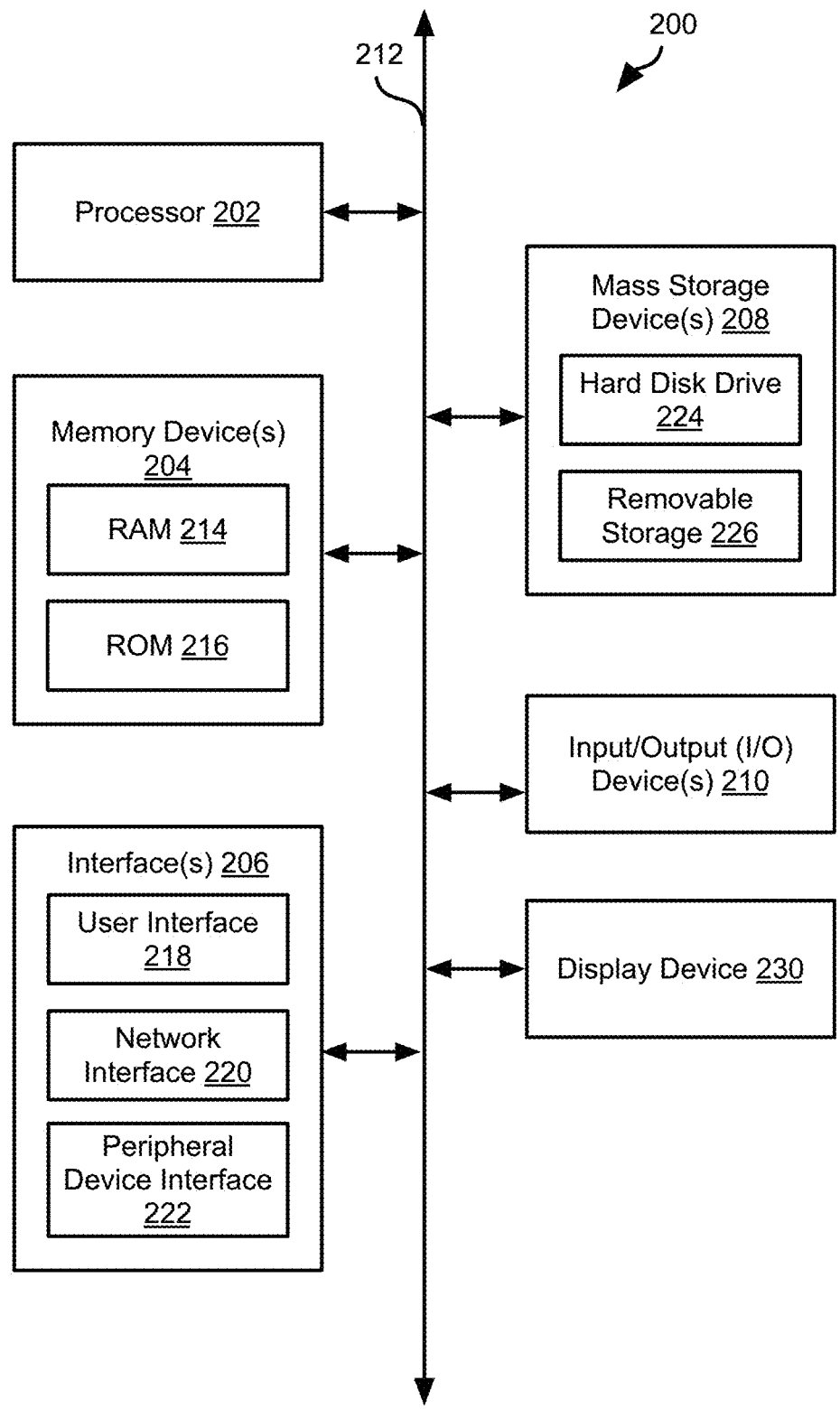
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, analyst workstation 104, crowdsourcing workstation 106, and merchant workstations 108, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
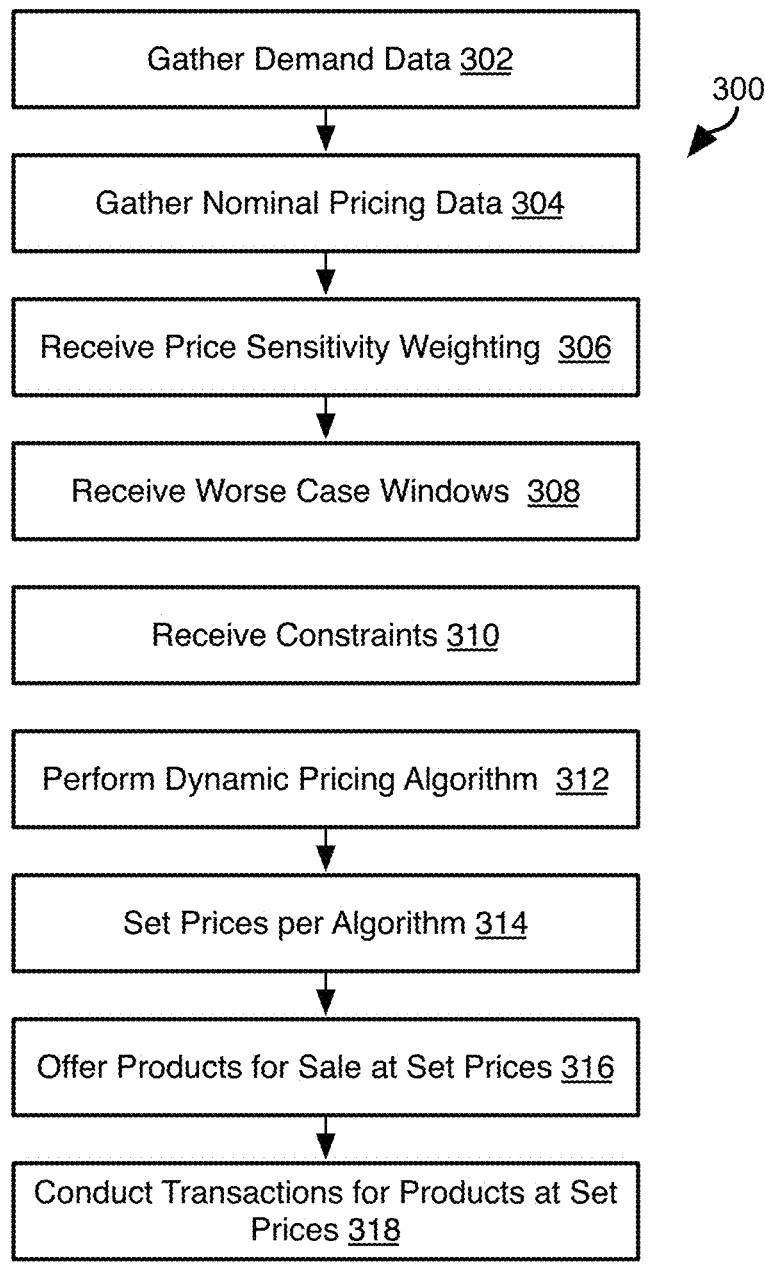
FIG. 3 is a process flow diagram of a method for performing dynamic pricing in accordance with an embodiment of the present invention.

FIG. 3 illustrates a method 300 for performing dynamic pricing and performing transactions for products priced according to the dynamic pricing algorithm. The method 300 may be executed by a server system 102. The method may include gathering 302 demand data over a time period. Demand data may be gathered in any manner known in the art and may raw data may be processed to characterize demand according to any manner known in the art. In particular, a price elasticity $g_i$ may be calculated for each product i based on sales and pricing data for the product i within some time window. The definition of demand and how it is used is described in greater detail below. The demand for the plurality of products may also include determining a baseline sales volume for each product. As described greater detail below a vector b of baseline sales volume for the plurality of products may be gathered from sales data such that $b_i$ is a baseline sales volume for the product i in order to determine an estimate of a design function, as described in greater detail below.

The method may include gathering 304 nominal pricing data for the plurality of products. For example, a nominal price may be the current price for each product at a point in time prior to executing the method 300. Alternatively, the current price of each product may be an average of prices for which the product was sold over a time window preceding execution of the method 300. The nominal price of a product may be the offer price for the product or the actual sale price for the product within some time window preceding execution of the method 300 thereby taking into account any discounts, price matching, or other variations from the offer price for the product.

The method 300 may include receiving 306 price sensitivity weightings. Weightings may be received for each product or specified for a class of products or by a received function definition that outputs a price sensitivity weighting for a product based on one or more attributes of the product such as price, category, sales volume, or other attribute. The usage and definition of the price sensitivity weightings θ and how they are used are described in greater detail below. In particular $θ_i$ may indicate a penalty applied to price increases of the price $p_i$ for product i.

The method 300 may include receiving 308 worse case windows for some or all of the demand data. As noted above demand for a product i may be a function of baseline sales $b_i$ and price elasticity $g_i$. Accordingly, a worse case window may include uncertainties $\pm\sigma_{b,i}$, $\pm\sigma_{g,i}$ in these values as specified by a user or determined according to some user specified function that takes as inputs attributes of a product and outputs uncertainties for these values. The manner in which these uncertainties are used is described in greater detail below.

The method 300 may further include receiving 310 one or more constraints on the prices for the plurality of products. For example, constraints may include a minimum price for each product, which may include a minimum margin for each product. Again, the minimum margin may be received from a user for each product or determined according to some user specified function based on attributes of the product.

The method 310 may include performing 312 a dynamic pricing algorithm that takes some or all of the data from the preceding steps 302-310. For example, performing 312 the dynamic pricing algorithm may include performing Algorithm 1 or Algorithm 2 as described below. Prices as determined by performing 312 the dynamic pricing algorithm may be used to set prices 314 for products. Prices may be transmitted to POS 106 or local servers accessed by POSs 106. Prices may also be stored in a product database for products sold online and prices displayed to users navigating the product database.

Products as priced according to prices set at step 314 may be offered 316 for sale. Offering a product for sale at a price may include posting prices on shelving or displays storing the product or affixing the price to the product itself or its packaging. Offering 316 a product for sale at a price may include storing the price in a product record that is accessible by a user, such as by means of a web interface and transmitting the product record to a user computing device with a web interface for invoking electronic purchasing of the product.

Transactions for purchase of the products as priced may be conducted 318 at the POS 106 or an ecommerce transaction. Transactions may be conducted according to any manner known in the art. For example, at a POS 106 an identifier of a product may be received by the POS 106, such as by scanning and tender of payment may be received at the POS 106 as cash or by electronic processing of payment information. The POS 106 may then transmit a record of the transaction to the server system 102. An ecommerce transaction may be conducted 318 by a user navigating a web interface to a product database, selecting a product, transmitting the selection to the server system 102, and transmitting payment information to the server system 102 which then processes payment and invokes fulfillment of an order for the product, i.e. invokes shipping of the product to the user.

The dynamic pricing algorithm will now be described in greater detail. The following description considers a formulation of the revenue management problem that is better aligned with "steady-state" online retail operations. First, it assumes that the resources to be priced are non-perishable, in the sense that, while the capacity at any given time is limited, it is also non-depleted in time thanks to an effective replenishment policy. Second, suppose that, over the time horizon considered for the pricing decision, demand is time invariant (also called time-homogeneous in the revenue management literature). Third and last, pricing strategies are desired that not only seek to maximize the revenue, but also maintain two other quantities within pre-specified levels: (i) the gross margin, defined as the ratio between profit and revenue, and (ii) the number of price increases at any given point. The former assumption responds to the need of running the business at pre-set margin levels, and is fundamentally different from traditional revenue management formulations where the current inventory is considered to be a sunk cost and hence revenue and margin grow together, making the need to control for margin unnecessary. The discussion below shows that under a separable linear demand model, the corresponding dynamic pricing problem can be cast as a simple convex Quadratic Constrained Quadratic Program (QCQP).

Like any other model-based pricing algorithm, the disclosed approach is susceptible to reality being different from what the disclosed model predicts. These deviations can have a severe impact on margin, especially in situations where the algorithm decides to hedge losses from products sold at a low margin with profit from products operating at a higher margin level. If the realized sales are different from the predicted ones (e.g. the items sold at low margin sell much more than expected) the margin can fall well below the nominal expected level. To mitigate this problem, the classical linear demand model is augmented to incorporate interval uncertainty on both the baseline sales as well as the price elasticity. The robust counterpart of the nominal problem can be cast as a convex problem with separable objective and two separable constraints. The structure of this problem is then exploited to derive a nested bisection algorithm on the dual problem that is scalable and easy to parallelize.

Since the main motivation is scalability, there are a number of important issues that are left out of the scope of this application. For instance, stochastic and/or time-variant demand models that typically result into complex Dynamic Pricing formulations are not considered here even for the single product case [see references 5, 7, 8, and 10]. Also the much more challenging problem of jointly pricing and estimating the demand model such as in references 2, 3, and 9 is not considered.

The description of the dynamic pricing algorithm is organized as follows. Section II states the nominal revenue maximization problem under margin and price increase constraints and derives the corresponding QCQP as well as its robust counterpart. Section III derives a nested bisection dual algorithm that applies to both the nominal and the robust problems, as well as to any convex problem with separable objective function and two separable constraints.

The notation convention in this paper is as follows. For a n-vector z, |z| denotes the vector formed with the absolute values of its elements. The symbols $\succcurlyeq$, $\preccurlyeq$ correspond to component-wise inequalities between vectors. For two n-vectors x, y, x∘y denotes the component-wise product, that is, the vector with components $x_i y_i$, i=1, . . . , n.

I. PROBLEM STATEMENT

Given a set of N different products, the traditional dynamic pricing for revenue management formulation seeks to maximize the cumulative revenue over a fixed time horizon H while making sure that the total volume of sales doesn't exceed the current inventory levels (capacity). A standard mathematical formulation of this problem reads (see reference 4):

$$\max_{\{p_t\}_{t=0}^H} \quad E\left[\int_0^H R_t(p_t) dt\right] \quad (1)$$
$$\text{s.t.}$$
$$\int_0^H D_t(p_t) dt \leq J$$
$$\underline{p} \preccurlyeq c_t \preccurlyeq \overline{p}, t \in [0, H]$$

where $H \in \mathbb{R}_+$ denotes the time horizon, $J \in \mathbb{R}^N$ is the vector of total capacity, $$R_t(p) = p^T D_t(p) \quad (2)$$

is the revenue at time t and $D_t(p): \mathbb{R}^N \to \mathbb{R}^N$ represents the stochastic demand process, which is a function of p, the price vector, and $\underline{p}$, $\overline{p}$ correspond to upper and lower bounds on the set of admissible prices. In this application, this formulation is augmented in two different ways. First, the aggregated gross margin should be controlled and is defined as:

$$M_t(p) = \frac{R_t(p) - c^T D_t(p)}{R(p)} \quad (3)$$

where c denotes the vector of costs per unit sold. Second, is desired to mitigate the negative impact of price increases. Accordingly the following value is defined:

$$S(p) = \theta^T \min(0, p - p^0) \quad (4)$$

where θ is a vector of weights summing up to 1 and $p^0$ denotes the prices at t<0. For θ=1/p, the function S(p) can be interpreted as a convex surrogate of the non-convex function card $((p-p^0)_+)$. It is clear from its definition that $S(p)$ is 0 for $p \preccurlyeq p^0$ and grows linearly with p.

The dynamic pricing problem under margin and limited price increase constraints can be stated as follows:

$$\max_{\{p_t\}_{t=0}^{H}} E\left[\int_0^H R_t(p_t)dt\right] \quad (5)$$

s.t.

$$\int_0^H D_t(p_t)dt \leq J$$

$$\int_0^H S(p_t)dt \leq \tau$$

$$-\int_0^H M_t(p_t)dt \leq \beta$$

$$\underline{p} \preccurlyeq c_t \preccurlyeq \overline{p}, t \in [0, H]$$

where $\beta \in [0,1]$ and $\tau \in [0, \infty)$ denote the desired margin and price increase parameters.

This application is concerned with algorithms to solve or approximate (5) when N is large, say, on the order of $10^4$ products. To this end, it is assumed that the demand process $D_t$ is deterministic, separable (by separable here it is meant that one item's price does not influence the demand of any other item in the set) and homogeneous in time. Thus, for a group of N items, the demand for a set of N items is modeled as a N-dimensional real vector which is as a separable linear function of the prices p:

$$D_t(p) = b + g \circ (p - p^0) \quad (6)$$

Here b denotes the vector of baseline sales, g corresponds to the vector of price elasticities and $p^0$ contains the prices of the item set at t<0. This linear model can be motivated in several ways. For example, one can interpret it as a linearization around $p^0$ of the usual exponential-logarithmic elasticity model:

$$b \cdot \exp\left(\gamma \cdot \log\left(\frac{p}{p^0}\right)\right) \quad (7)$$

where $g_i = p^0/b_i$. For a small enough price interval $p \in [\underline{p}, \overline{p}]$, the smoothness of (7) justifies the approximation via (6).

A. Nominal Problem

It is easy to prove (see, for instance, references 4 and 7) that under the simplified demand model (6), problem (5) can be solved via the fixed price problem:

$$p^* = \arg\max_p R(p) \quad (8)$$

s.t. $-M(p) \leq \beta$ $S(p) \leq \tau$ $0 \leq D(p) \leq \frac{J}{H}$ $\underline{p} \preccurlyeq c \preccurlyeq \overline{p}$ and setting $p^t = p^*$.

It is assumed henceforth that H=1. Replacing R(p), M(p), and S(p) by their definitions and doing minimal arithmetic manipulations, one obtains the nominal revenue maximization problem:

$$\max_p \quad p^T(b - g \cdot (p - p^0)) \quad (9)$$

s.t. $\theta^T \max(0, p - p^0) \leq \tau$ $(\kappa p - c)^T(b - g \cdot (p - p^0)) \geq 0$ $0 \preccurlyeq b - g \cdot (p - p^0) \preccurlyeq J$ $\underline{p} \preccurlyeq c \preccurlyeq \overline{p}$ where $\kappa := 1 - \beta \in [0,1]$.

If $g \succcurlyeq 0$ and $\beta \leq 1$, (9) is readily identified as a convex Quadratic Constrained Quadratic Program (QCQP). In general, the assumption of non-positive elasticity is coherent with the understanding that demand should not increase with price. The reasonable assumption is made that the lower bound on the price vector p is non-negative: $\underline{p} \succcurlyeq 0$.

B. Robust Counterpart

Next it is assumed that the vectors b and g in the demand model (6) are subject to box uncertainty. Precisely:

$$b \in B := [b^n - \sigma_b, b^n + \sigma_b]$$

$$g \in g := [g^n - \sigma_b, b^n + \sigma_b] \quad (10)$$

where $b^n$ and $g^n$ correspond to nominal values, and $\sigma_b$ and $\sigma_g$ contain information about uncertainty ranges and can be estimated from the prediction error of the linear demand model. It will be convenient to denote $g^{min} := g^n - \sigma_g$, $g^{max} := g^n - \sigma_g$. It is further assumed that $g^{min} \geq 0$ and $\mathcal{U} := B \times g$ denotes the set of allowable pairs (b, g) under the box uncertainty model.

The robust counterpart of (9) is defined as:

$$\max_p \quad \min_{(b,g) \in \mathcal{U}} p^T(b - g \cdot (p - p^0)) \quad (11)$$

s.t. $\theta^T \max(0, p - p^0) \leq \tau$ $\forall (b, g) \in \mathcal{U}: (\kappa p - c)^T(b - g \cdot (p - p^0)) \geq 0$ $\forall (b, g) \in \mathcal{U}: 0 \preccurlyeq b - g \cdot (p - p^0) \preccurlyeq J$ $\underline{p} \preccurlyeq c \preccurlyeq \overline{p}$ The above problem is simplified and it is shown that it is indeed a tractable convex problem. For this purpose, the following functions G and H are defined, with values $$G(p) := \Sigma_{i=1}^p \max(g_i^{min} w_i(w_i - w_i^0)) =$$

$$1^T \max(g^{min} \cdot p \cdot (p - p^0), g^{max} \cdot p \cdot (p - p^0)),$$

$$H(p) := \Sigma_{i=1}^p \max(g_i^{min}(\kappa w_i - p_i)(w_i - w_i^0), g_i^{max}(\kappa w_i - p_i)(w_i - w_i^0)) =$$

$$1^T \max(g^{min} \cdot (\kappa p - c) \cdot (p - p^0), g^{max} \cdot (\kappa p - c) \cdot (p - p^0))$$

where the operators max and min operate componentwise. Since it is assumed that $g^{max} \succcurlyeq g^{min} \succcurlyeq 0$, the functions G and H are both convex. If, in addition, $g^{min} \succ 0$, then both G(p) and H(p) are strictly convex. The objective in the robust counterpart (10) can be understood as the worst-case revenue relative to the demand uncertainty:

$$R_{wc}(p) := \min_{(b,g) \in \mathcal{U}} p^T(b - g \circ (p - p^0))$$

Separating the roles of b and g, and exploiting the fact that $u := B \times g$:

$$R_{wc}(p) := \min_{b \in B} p^T b - \max_{g \in g} p^T(g \circ (p - p^0)),$$

from one easily obtains $$R_{wc}(p) := p^T b^n - \sigma_b^T |p| - \sum_{i=1}^{p} \max(g_i^{min} w_i(w_i - w_i^0),$$

$$g_i^{max} w_i(w_i - W_i^0))$$

$$= p^T b^n - \sigma_b^T |p| - G(p)$$

$$= p^T (b^n - \sigma_b) - G(p).$$

where the last equality follows from the assumption that p. Since G is convex, the worst-case revenue is a concave function of $p \succcurlyeq p \succcurlyeq 0$.

We will proceed in a similar fashion to simplify the characterization of the robust margin constraint:

$$\{p: \forall (b,g) \in u: \kappa p^T(b - g \circ (p - p^0)) - c^T(b - g \circ (p - p^0)) \geq 0\}.$$

Since u:=B×g, the above can be written $$\{p: \min_{b \in B} b^T(\kappa p^T(\kappa p - c) \geq \max_{g \in g}(\kappa p - c)^T(g \circ (p - p^0)))\},$$

which is easily seen to be equivalent to $$\{p: (\kappa p - c)^T b^n - \sigma_b^T |\kappa p - c| \geq H(p)\}.$$

The convexity of this constraint set follows from the concavity of H(p) and the convexity of the right-hand side terms.

Finally, for the inventory constraint, one may use a condition of the form $$\forall (b,g) \in U: 0 \preccurlyeq b - g \circ (p - p^0) \preccurlyeq J$$

The above is equivalent to $$\sigma_b + \sigma_g \circ |p - p^0| \preccurlyeq b^n - g^n \circ (p - p^0) \preccurlyeq J - \sigma_b - \sigma_g \circ |p - p^0|.$$

which can in turn be expressed as interval constraints on p, as seen in Appendix A, and will henceforth, without loss of generality, be incorporated in the upper and lower price bounds p and p.

Gathering these results, one obtains the following simplified expression for the robust counterpart (10):

$$\max_{p \in w} \quad p^T(b^n - \sigma_b) - G(p) \quad (12)$$

$$\text{s.t} \quad \theta^T \min(0, p - p^0) \leq \tau,$$

$$(\kappa p - c)^T b^n \geq H(p) + \sigma_b^T |\kappa p - c|,$$

$$\underline{p} \preccurlyeq p \preccurlyeq \overline{p}$$

which is a convex problem and additionally enjoys the property of having separable objective and constraint functions, relative to the decision variables p. This property is exploited in the following section.

II. ALGORITHMS

In this section algorithms are developed to solve a generic problem of the form:

$$\max_{p \in w} f(p): q(p) \geq 0, \quad (13)$$

where $$q(p) := \min(g(p), h(p)) \quad (14)$$

and f, g, and h are concave, decomposable, and W is a closed interval set with non-empty interior. It is further assumed that the problem is strictly feasible, more precisely, there exist a p∈int W such that q(p)>0. Note that both the nominal revenue maximization problem (9) and its robust counterpart (11) are special cases of (13).

Problem (13) admits the following dual:

$$\min_{\eta \geq 0} G(\eta) \quad (15)$$

where the dual function is $$G(\eta) = \max_{p \in W} f(p) + \eta q(p).$$

Strong duality holds in view of the convexity of (13) and the strict feasibility assumption. Thus the optimum primal-dual pair (p*, η*) is:

$$f(p^*) = G(\eta^*) = \max_{p \in W} f(p) + \eta^* q(p)$$

$$q(p^*) \geq 0 \quad (16)$$

For a given one can define a primal candidate as:

$$p_\eta := \arg \max_{p \in W} f(p) + \eta g(p). \quad (17)$$

By the strong duality relation, if the primal candidate constructed from the optimal dual variable $p_{\eta^*}$ is primal feasible $q(p_{\eta^*}) \geq 0$), then $p_{\eta^*}$ is also primal optimal. In the special case where f(p) is strictly convex, $p_{\eta^*}$ is guaranteed to be primal-optimal. In the sequel, it is assumed that f(p) is strictly convex, which is the case in the problems if $g_{min} > 0$. These observations motivate solving the primal problem (15) by doing a line-search over the dual variable η until the duality gap evaluated at the primal and dual candidates (η, $p_\eta$) is below a desired tolerance level. A standard result of convex analysis allows one to evaluate a subgradient of G(η*) for the same cost of obtaining a primal candidate:

$$q(p_\eta) \in \partial G(\eta) \quad (18)$$

where ∂G(η) denotes the set of subgradients of G(η) at η. Algorithm 1 describes an implementation of a dual line-search process using a bi-section approach relying on evaluations of the sub-gradients of G(η).

TABLE 1

| Algorithm 1: Bi-section method to solve (13) and (15) |
|---|
| Data: Tolerance level ϵ, upper bound $\eta_{max}$<br>Result: $p_\eta$, η verifying \|f($p_\eta$) − G(η)\| ≤ ϵ<br>$p_\eta \leftarrow$ arg $\max_{p \in W}$ f(p) + $\eta_{max}$q(p);<br>$\eta_{min}$ = 0;<br>while \|f($p_\eta$) − G(η)\| ≤ ϵ do<br>$\quad \eta \leftarrow \frac{\eta_{max} + \eta_{min}}{2}$;<br>$\quad p_\eta \leftarrow$ arg $\max_{p \in W}$ f(p) + ηq(p);<br>$\quad$ if q ($p_\eta$) ≤ 0 then<br>$\quad \quad \eta_{min}$ = η<br>$\quad$ else<br>$\quad \quad \eta_{max}$ = η<br>$\quad$ end<br>end |

The application of Algorithm 1 requires three elements that have not yet been addressed. First, it is assumed that the problem is strictly feasible, which is something that will need to be verified in practice. Second, Algorithm 1 requires an upper bound on the dual optimal variable $\eta^* < \eta_{max}$ to give the bi-section search an initial interval. Finally, the algorithm is designed to terminate at an $\hat{\eta}$ with small duality gap but likely different than η*. Thus it is not clear that the primal candidate $p_{\hat{\eta}}$ constructed in such way will be primal-feasible. Fortunately, the following sections provide positive answers to all of these questions.

A. Detecting Infeasibility and Estimating $\eta^{Max}$

Here is considered the problem of finding a strictly feasible point for (13), or determining there is no such point. This can be done by computing:

$$p_f := \arg\max_{p \in W} q(p) \qquad (19)$$

Problem (13) is strictly feasible if and only if $q(p_f) > 0$, in which case $p_f \in W$ is a primal-feasible point. On the other hand, recall that:

$$G(0) = \max_{p \in W} f(p), \qquad (20)$$

which is easily computed thanks to the separability of $f(p)$.

Since $p_f$ defined earlier belongs to W, at the dual optima $\eta^*$ there are the inequalities:

$$g(0) \geq g(\eta^*) = \max_{p \in W} f(p) + \eta^* q(p) \geq f(p_f) + \eta^* q(p_f), \qquad (21)$$

from which it follows that $$\eta^* \leq \eta_{max} := \frac{g(0) - f(p_f)}{q(p_f)}$$

B. A Nested Bisection Algorithm

A common pattern arising in the calculation of $p_f$, $G(0)$ and the primal candidate (17) is the need to solve problems of the form:

$$\max_{p \in W} \alpha f(p) + \beta q(p) \qquad (22)$$

Convex duality is used to formulate (22) as a one-dimensional problem, which will be solved via a bisection procedure. As is shown below, each step in this inner bisection will require the solution of at most N one-dimensional convex problems.

First (22) is rewritten as:

$$\max_{p \in W} \alpha f(p) + \beta q(p)$$
$$g(p) \geq t$$
$$h(p) \geq t$$

The dual function is given by $$\max_{p \in W} \alpha f(p) + \beta t - \lambda_1(g(p) - t) - \lambda_2(h(p) - t)$$
$$g(p) \geq t$$
$$h(p) \geq t$$

with dual variables $\lambda_1 \geq 0$, $\lambda_2 \geq 0$, and is unbounded in t unless $\lambda_1 + \lambda_2 \geq b$. The dual problem is thus:

$$\min_{0 \leq \lambda \leq \beta} \{D(\lambda) := \max_{p \in W} \alpha f(p) + \lambda g(p) + (\beta - \lambda) h(p)\} \qquad (23)$$

By the assumption that $\exists p \in \text{int } W$ and the concavity of $f$, $g$, and $h$ strong duality holds and, by the strict convexity of $f(p)$, the solution to (22) can be recovered from:

$$\hat{p}_{\lambda^*} = \max_{p \in W} \alpha f(p) + \lambda^* g(p) + (\beta - \lambda^*) h(p) \qquad (24)$$

where $\lambda^*$ is the solution to the dual problem (23). Finally, one can solve the latter via a subgradient-based "inner" bisection on $0 \leq \lambda \leq \beta$, where a subgradient of $D(\lambda)$ at $\lambda$ is given by:

$$g(\hat{p}_\lambda) - h(\hat{p}_\lambda) \in \partial D(\lambda) \qquad (25)$$

Before the final algorithm is stated, it will be convenient to define the generic subroutine:

$$p \leftarrow \text{MaximizeSeparable}(\alpha, \beta, \lambda, f, g, h) \qquad (26)$$

which takes the parameters $\alpha$, $\beta$, $\lambda$ and the functions $f$, $g$, $h$ as an input and returns the solution to (24) as an output. Note that most of the calculations will rely on calls to this subroutine, which requires only the solution of N independent convex problems. Its implementation will depend on the nature of $f$, $g$, and $h$; for instance, in the nominal problem, $f$ and $h$ are quadratic and $g$ is linear hence each call to MaximizeSeparable only requires N simple algebraic operations. On the other hand, in the robust counterpart problem (12), $f$ and $h$ are non-smooth convex functions hence MaximizeSeparable will require N independent linesearches. In all cases, however, the evaluation of MaximizeSeparable is highly parallelizable since both the data and the numerical operations are independent across the N items.

Incorporating this notation and the inner bisection process into Algorithm 1 gives rise to the nested bi-section algorithm to solve the original problem (13) and its dual (15), which is given as Algorithm 2, below.

TABLE 2

Algorithm 2: Nested bi-section method to solve (13) and (15)

Data: Tolerance level $\epsilon$, strictly convex separable function f, convex separable functions g, h
Result: $p_\eta$, $\eta$ verifying $|f(p_\eta) - G(\eta)| \leq \epsilon$ or declare infeasibility.
\# Compute $p_f = \arg\max_{w \in W} q(p)$ via inner bi-section;
$\lambda_{min}, \lambda_{max} \leftarrow 0, 1$ ;
while $|q(p_f) - D(\lambda)| \leq \epsilon$ do
$\quad \lambda = \frac{\lambda_{min} + \lambda_{max}}{2}$;
$\quad p_f \leftarrow$ MaximizeSeparable(0, 1, $\lambda$, f, g, h);
$\quad$ if g ($p_f$) – h ($p_f$) ≤ 0 then
$\quad\quad \lambda_{min} = \lambda$
$\quad$ else
$\quad\quad \lambda_{max} = \lambda$
$\quad$ end
end
if $q(p_f) \leq 0$ then
$\quad$ Declare infeasible and exit;
else
$\quad$ \# Compute G(0) and $\eta_{max}$;
$\quad p_0 \leftarrow$ MaximizeSeparable(1, 0, 0, f, g, h);
$\quad G(0) \leftarrow f(p_0)$;
$\quad \eta_{max} = \frac{G(0) - f(p_r)}{f(p_f)}$;
$\quad \eta_{min} = 0$;
$\quad \eta \leftarrow 0$ ;
$\quad$ \# Outer bisection on $\eta$;
$\quad$ while $|f(p_\eta) - G(\eta)| \leq \epsilon$ do
$\quad\quad \eta \leftarrow \frac{\eta_{max} + \eta_{min}}{2}$;
$\quad\quad$ \# Inner bisection on $\lambda$ to evaluate $p_\eta = \arg\max_{w \in W} f(p) + \eta q(p)$;
$\quad\quad \lambda_{min}, \lambda_{max} \leftarrow 0, \eta$ ;
$\quad\quad$ while $|f(p_\eta) + \eta q(p_\eta) - D(\lambda)| \leq \epsilon$ do
$\quad\quad\quad \lambda = \frac{\lambda_{min} + \lambda_{max}}{2}$;
$\quad\quad\quad p_\eta \leftarrow$ MaximizeSeparable(1, $\eta$, $\lambda$, f, g, h);
$\quad\quad\quad$ if $g(p_\eta) - h(p_\eta) \leq 0$ then
$\quad\quad\quad\quad \lambda_{min} = \lambda$ TABLE 2-continued Algorithm 2: Nested bi-section method to solve (13) and (15)

```
|    |    |    else
|    |    |    |    λ_max = λ
|    |    |    end
|    |    end
|    |    if q (p_η) ≤ 0 then
|    |    |    η_min = η
|    |    else
|    |    |    η_max = η
|    |    end
|    end
|    return p_η, η;
end
```

C. Primalization

In this section the issue of primalization is discussed, that is, recovering a feasible, sub-optimal variable for the primal problem. For $\tau \geq 0$, define the perturbed problem denoted $P(\tau)$:

$$P(\tau): p^*(\tau) := \max_{p \in W} f(p) : q(p) \geq \tau. \tag{27}$$

Figure 4:
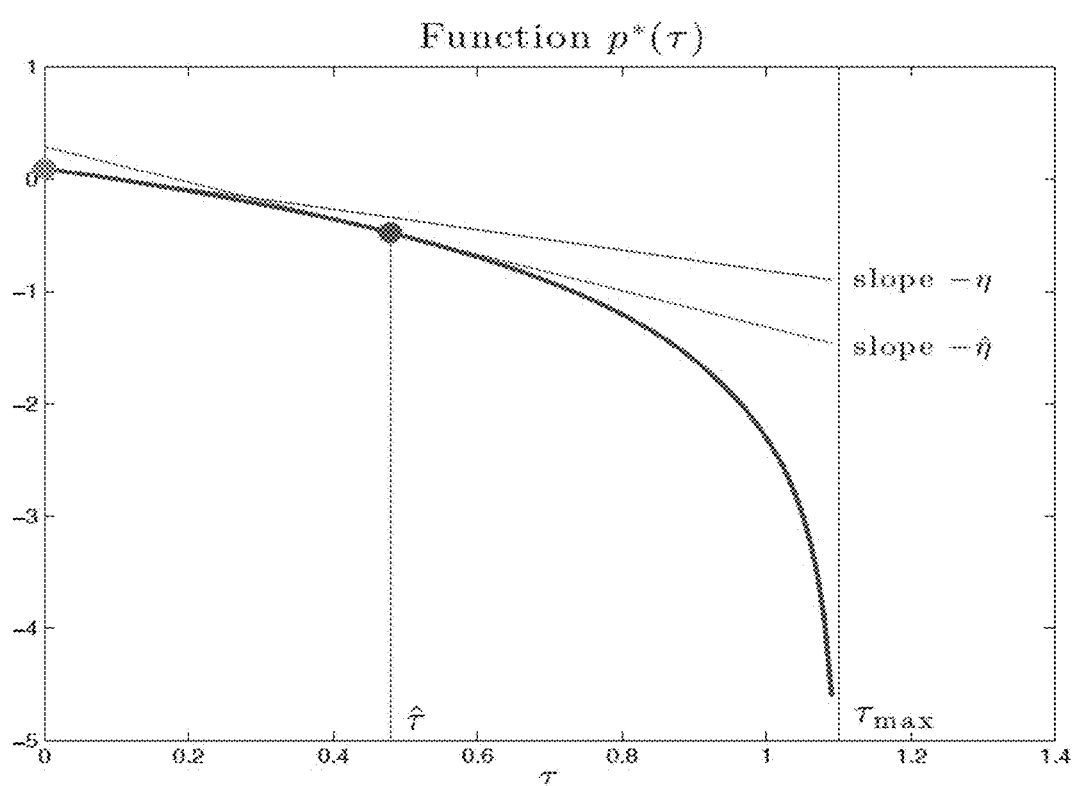
FIG. 4 is a plot illustrating an inner bisection method in accordance with an embodiment of the present invention.

By construction, and as seen in FIG. 4, the function $\tau \to p^*(\tau)$ is concave and decreasing monotonically. Also, when $\tau \to \tau_{max}$, $p(\tau) \to -\infty$, where $\tau_{max}$ is the largest value of the function q, as defined in (13). Let $\eta^*$ be dual-optimal for the problem $P(0)$. Assume that dual-optimal for the problem $P(0)$. Assume that one has, at the end of the bisection algorithm, located $\eta^*$ within an interval $[\underline{\eta}, \overline{\eta}]$, of width $\in$. Then $\eta^* + \in \geq \overline{\eta} \geq \eta^*$. The last inequality, together with the monotonicity property of $p^*(\cdot)$, shows that $\overline{\eta}$ is dual-optimal for the problem $P(\tau)$ for some $\tau \geq 0$.

Denote by $\overline{p} \in W$ a corresponding optimal point in the problem $$\max_{p \in W} f(p) + \overline{\eta} q(p) \tag{28}$$

Assuming such a point is unique (in the use cases addressed by this application, this uniqueness results from the strict convexity of the functions involved), since $\overline{\eta}$ is dual-optimal for problem $P(\tau)$, the vector $\overline{p}$ is primal-optimal for the same problem. Thus a primal feasible point has been generated that is optimal for some strengthened version of the original problem.

III. APPENDIX

Let $\alpha, \lambda \in R$ and $\rho > 0$. The condition $$\forall c \in [\alpha - \rho, +\rho] : c \xi \leq \gamma$$

can be written as $$\alpha \xi + \rho |\xi| \leq \gamma$$

In turn, the above condition can be expressed in interval form: $\xi \in I[\underline{\xi}, \overline{\xi}]$, where the extended reals $\underline{\xi}, \overline{\xi}$ assume the following values.

1) if $\alpha > \rho$, then:

$$\underline{\xi} = -\infty, \overline{\xi} = \min\left(\frac{\gamma}{\alpha - \rho}, \frac{\gamma}{\alpha + \rho}\right) = \begin{cases} \frac{\gamma}{\alpha + \rho} & \text{if } \gamma \geq 0, \\ \frac{\gamma}{\alpha - \rho} & \text{if } \gamma \leq 0. \end{cases}$$

2) if $\alpha < -\rho$, then:

$$\overline{\xi} = +\infty, \underline{\xi} = \max\left(\frac{\gamma}{\alpha - \rho}, \frac{\gamma}{\alpha + \rho}\right) = \begin{cases} \frac{\gamma}{\alpha - \rho} & \text{if } \gamma \geq 0, \\ \frac{\gamma}{\alpha + \rho} & \text{if } \gamma \leq 0. \end{cases}$$

3) if $|\alpha| < \rho$, then the interval $[\underline{\xi}, \overline{\xi}]$ is empty when $\gamma > 0$, otherwise:

$$\underline{\xi} = \frac{\gamma}{\alpha - \rho}, \overline{\xi} = \frac{\gamma}{\alpha + \rho}.$$

4) if $\alpha = \rho$, then the interval $[\underline{\xi}, \overline{\xi}]$ is empty when $\gamma < 0$, otherwise:

$$\underline{\xi} = -\infty, \overline{\xi} = \frac{\gamma}{\alpha + \rho}.$$

5) if $\alpha = -\rho$, then the interval $[\underline{\xi}, \overline{\xi}]$ is empty when $\gamma < 0$, otherwise:

$$\underline{\xi} = \frac{\gamma}{\alpha - \rho}, \overline{\xi} = +\infty.$$

In this context, a pair of conditions of the form $$\alpha \xi + \rho |\xi| \leq \gamma^+, -\alpha \xi + \rho |\xi| \leq \gamma^-$$

are used where $\alpha, \rho, \gamma \pm$ are given, with $\alpha > \rho > 0$. Combining the previous results leads to the interval $[\underline{\xi}, \overline{\xi}]$, where $$\underline{\xi} = \max\left(\frac{-\gamma^-}{\alpha + \rho}, \frac{-\gamma^-}{\alpha - \rho}\right), \overline{\xi} = \min\left(\frac{\gamma^+}{\alpha - \rho}, \frac{\gamma^+}{\alpha + \rho}\right).$$

The interval is empty when $\underline{\xi} > \overline{\xi}$.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

IV. REFERENCES

The following references are incorporated herein by reference in their entirety for all purposes

[1] Aharon Ben-Tal, Laurent El Ghaoui, and Arkadi Nemirovski. *Robust optimization*. Princeton University Press, 2009.
[2] Dimitris Bertsimas and Georgia Perakis. *Dynamic pricing: A learning approach*. Springer, 2006.
[3] Omar Besbes and Assaf Zeevi. Dynamic pricing without knowing the demand function: Risk bounds and near-optimal algorithms. *Operations Research*, 57(6):1407-1420, 2009.
[4] Gabriel Bitran and Ren'e Caldentey. An overview of pricing models for revenue management. *Manufacturing & Service Operations Management*, 5(3):203-229, 2003.

[5] Gabriel Bitran, Rene Caldentey, and Susana Mondschein. Coordinating clearance markdown sales of seasonal products in retail chains. *Operations research*, 46(5):609-624, 1998.

[6] Wedad Elmaghraby and Pinar Keskinocak. Dynamic pricing in the presence of inventory considerations: Research overview, current practices, and future directions. *Management Science*, 49(10):1287-1309, 2003.

[7] Guillermo Gallego and Garrett Van Ryzin. Optimal dynamic pricing of inventories with stochastic demand over finite horizons. *Management science*, 40(8):999-1020, 1994.

[8] Wilfred M Kincaid and Donald A Darling. An inventory pricing problem. *Journal of Mathematical Analysis and Applications*, 7(2): 183-208, 1963.

[9] Miguel Sousa Lobo and Stephen Boyd. Pricing and learning with uncertain demand. *Preprint, Fuqua School of Business*, Duke University, 2003.

[10] Anshul Sood. Competitive multi-period pricing for perishable products. PhD thesis, Massachusetts Institute of Technology, 2004.

The invention claimed is:

1. A method performed by a computer system, using one or more processing devices, comprising:

receiving demand data comprising nominal pricing data, price sensitivity weighting data, and worst case window data, over a particular time period for the demand data, for a plurality of products i;

receiving sales data associated with each product i of the plurality of products i, the demand data and the sales data stored in a pricing database, wherein a price elasticity is calculated for the each product i of the plurality of products i based on the sales data and the nominal pricing data for the each product i within a pre-determined period of time;

receiving price data sets via the pricing database communicatively coupled to one or more point of sale (POS) devices located at one or more retail establishments, the price data sets comprising:

price increase weights indicating a price penalty for price increases on the each product i of the plurality of products i;

baseline prices indicating price offers for the each product i; and window data indicating uncertainty in demand for the plurality of products i;

defining a revenue function $f(p)$, where p is a set of prices, wherein p(i) is a possible price of product i, the revenue function $f(p)$ comprising a function of predicted demand determined from the sales data, as received, and the uncertainty, as received, in the demand;

receiving one or more price constraints for the plurality of products i, stored in the pricing database, wherein the one or more price constraints define a constraint $q(p) > 0$ based on at least one of:

a margin constraint;

a capacity constraint; or a price increase sensitivity for the plurality of products i;

defining a dual function $G(\eta)$ corresponding to the revenue function $f(p)$ and the constraint $q(p)$, the dual function $G(\eta)$ being defined as $G(\eta) = \max_{p \in W} f(p) + \eta q(p)$, where $\eta$ is an arbitrary variable and W is a set of all possible prices of the set of prices p for the each product i;

identifying a set of prices $p_\eta$ of the set of prices p using data in the pricing database and a pricing algorithm according to a bisection algorithm using the revenue function $f(p)$, the constraint $q(p)$, and the dual function $G(\eta)$, stored in the pricing database, wherein the set of prices $p_\eta$ are for the plurality of products i, wherein the bisection algorithm is performed by running multiple concurrent instances of a MaximizeSeparable subroutine across multi-core processors in a parallel architecture, each of the multiple concurrent instances of the MaximizeSeparable subroutine comprising determining a solution of an independent convex problem using a subgradient-based inner bisection, each iteration of the bisection algorithm comprises computation of a plurality of independent one-dimensional computations using the MaximizeSeparable subroutine to price the each product i of the plurality of products i, and each core of the multi-core processors computes one of the plurality of independent one-dimensional computations;

transmitting the set of prices $p_\eta$ to (a) a point of sale (POS) device of the one or more POS devices or (b) a product database for online e-commerce;

when the set of prices $p_\eta$ are transmitted to the product database, facilitating a display, via a network, of the set of prices $p_\eta$ for the plurality of products i to electronic computing devices of users navigating the product database; and receiving transaction records for purchases of the plurality of products i as priced by the pricing algorithm.

2. The method of claim 1, wherein the bisection algorithm comprises Algorithm 2 of Table 2.

3. The method of claim 1, further comprising:

transmitting the set of prices $p_\eta$ to the one or more point of sale (POS) devices; and conducting on the one or more POS devices transactions for purchase of units of one or more products at corresponding prices from the set of prices $p_\eta$.

4. The method of claim 1, further comprising:

transmitting offers for sale for the plurality of products i at the set of prices $p_\eta$ to electronic computing devices of users; and conducting electronic transactions to purchase units of one or more products of the plurality of products i at corresponding prices from the set of prices $p_\eta$.

5. The method of claim 1, wherein:

the bisection algorithm comprises determining the set of prices $p_\eta$ such that an aggregate margin is above a pre-specified level under the uncertainty in the demand, as received.

6. The method of claim 5, wherein the bisection algorithm is further performed in an interval-uncertain separable linear demand model.

7. The method of claim 1, wherein:

the bisection algorithm further comprises facilitating pricing of the plurality of products i for an online retailer.

8. A method performed by a computer system, using one or more processing devices, comprising:

receiving, via a network, demand data comprising nominal pricing data, price sensitivity weighting data, and worst case window data, over a particular time period for the demand data, for a plurality of products i;

receiving sales data associated with each product i of the plurality of products i, the demand data and the sales data stored in a pricing database, wherein a price elasticity is calculated for the each product i of the plurality of products i based on the sales data and the nominal pricing data for the each product i within a pre-determined period of time;

receiving price data sets via the pricing database communicatively coupled to one or more point of sale (POS) devices located at one or more retail establishments, the price data sets comprising:
- price increase weights indicating a price penalty for price increases on the each product i of the plurality of products i;
- baseline prices indicating price offers for the each product i; and
- window data indicating uncertainty in demand for the plurality of products i;

defining a revenue function $f(p)$, where p is a set of prices, wherein p(i) is a possible price of product i, the revenue function $f(p)$ comprising a function of predicted demand determined from the sales data, as received, and the uncertainty, as received, in the demand;

receiving one or more price constraints for the plurality of products i, stored in the pricing database, wherein the one or more price constraints define a constraint $q(p) \geq 0$ based on at least one of:
- a margin constraint;
- capacity constraint; or
- a price increase sensitivity for the plurality of products i;

defining a dual function $G(\eta)$ corresponding to the revenue function $f(p)$ and the constraint $q(p)$, the dual function $G(\eta)$ being defined as $G(\eta)=\max_{p \in W} f(p)+\eta q(p)$, where $\eta$ is an arbitrary variable and W is a set of all possible prices of the set of prices p for the each product i;

receiving a tolerance $\epsilon$;

receiving a maximum value $\eta_{max}$ of $\eta$; and identifying an optimized set of prices $p_\eta$ of the set of prices p according to a pricing algorithm stored in the pricing database and using data in the pricing database, wherein the optimized set of prices $p_\eta$ are for the plurality of products i, wherein the pricing algorithm is performed by running multiple concurrent instances of a MaximizeSeparable subroutine across multi-core processors in a parallel architecture, each of the multiple concurrent instances of the MaximizeSeparable subroutine comprising determining a solution of an independent convex problem using a subgradient-based inner pricing algorithm, each iteration of the pricing algorithm comprises computation of a plurality of independent one-dimensional computations using the MaximizeSeparable subroutine to price the each product i of the plurality of products i, and each core in the multi-core processors computes one of the plurality of independent one-dimensional computations:

(A) let $p_\eta$ be the optimized set of prices p for which an expression $\max_{p \in W} f(p)+\eta_{max} q(p)$ is satisfied;

(B) let $\eta_{min}=0$; and (C) while $|f(p_\eta)-G(\eta)| \leq \epsilon$ perform:

(i) let $$\eta = \frac{\eta_{max}+\eta_{min}}{2};$$

(ii) let $p_\eta$ be the optimized set of prices p for which the expression $\max_{p \in W} f(p)+\eta q(p)$ is satisfied; and (iii) if $q(p_\eta) \leq 0$, then let $\eta_{min}=\eta$, else let $\eta_{max}=\eta$;

transmitting the optimized set of prices $p_\eta$ to (a) a point of sale (POS) device of the one or more POS devices or (b) a product database for online e-commerce;

when the set of prices $p_\eta$ are transmitted to a product database, facilitating a display, via a network, of the set of prices $p_\eta$ for the plurality of products i to electronic computing devices of users navigating the product database; and receiving transaction records for purchases of the plurality of products i as priced by the pricing algorithm.

9. The method of claim 8, wherein:

$f(p)$ is defined as $p^T(b''-\sigma_b)-G(p)$;

$\sigma_b$ is a baseline sales uncertainty, as received;

$G(p)$ is defined as $1^T \max(g^{min} \circ p \circ (p-p^0), g^{max} \circ p \circ (p-p^0))$;

$p^0$ is a baseline pricing data from the sales data;

$b''$ is a baseline sales data based on the sales data, as received;

$g^{min}$ is defined as $g''-\sigma_g$;

$g^{max}$ is defined as $g''+\sigma_g$;

$g''$ is a baseline price elasticity based on the sales data; and $\sigma_9$ is a baseline price elasticity uncertainty, as received.

10. The method of claim 9, wherein:

the constraint $q(p)$ is defined as $\min(g(p), h(p))$;

$g(p)$ of $\min(g(p), h(p))$ is defined as $\tau-\theta^T \max(0, p-p^0)$, where $\tau(i)$ is a predetermined price increase limit value for each product i;

$h(p)$ of $\min(g(p), h(p))$ is defined as $(\kappa p-c)^T b''-H(p)-\sigma_b^T |\kappa p-c|$, where $\kappa$ is defined as $1-\beta$, where $\beta(i)$ is a desired margin constraint, as received, for each product i;

$H(p)$ is defined as $H(p)=1^T \max(g^{min} \circ (\kappa p-c) \circ (p-p^0), g^{max} \circ (\kappa p-c) \circ (p-p^0))$; and c(i) is defined as a cost per unit of each product i.

11. The method of claim 8, further comprising:

transmitting the optimized set of prices $p_\eta$ to the one or more point of sale (POS) devices; and conducting on the one or more POS devices transactions for purchase of units of one or more of the plurality of products i at corresponding prices from the optimized set of prices $p_\eta$.

12. The method of claim 8, further comprising:

transmitting offers for sale for the plurality of products i at the optimized set of prices $p_\eta$ to electronic computing devices of users; and conducting electronic transactions to purchase units of the plurality of products i at corresponding prices from the optimized set of prices $p_\eta$.

13. A method performed by a computer system, using one or more processing devices, comprising:

receiving demand data comprising nominal pricing data, price sensitivity weighting data, and worst case window data, over a particular time period for the demand data, for a plurality of products i;

receiving sales data associated with each product i of the plurality of products i, the demand data and the sales data stored in a pricing database, wherein a price elasticity is calculated for the each product i of the plurality of products i based on the sales data and the nominal pricing data for the each product i within a pre-determined period of time;

receiving price data sets, via the pricing database communicatively coupled to one or more point of sale (POS) devices located at one or more retail establishments, the price data sets comprising:

price increase weights indicating a price penalty for price increases on the each product i of the plurality of products i;

baseline prices indicating price offers for the each product i of the plurality of products i; and window data indicating uncertainty in demand for the plurality of products i;

defining a revenue function $f(p)$, where p is a set of prices wherein p(i) is a possible price of product i, the revenue function $f(p)$ comprising a function of predicted demand determined from the sales data, as received, and the uncertainty, as received, in the demand;

receiving one or more price constraints for the plurality of products i, stored in the pricing database, wherein the one or more price constraints define a constraint q(p)>0 based on at least one of:

a minimum price;

a capacity constraint g(p); or a price increase sensitivity constraint h(p) for the plurality of products i;

defining a first dual function $G(\eta)$ corresponding to the revenue function $f(p)$ and the constraint q(p), the first dual function $G(\eta)$ being defined as $G(\eta)=\max_{p \in W} f(p)+\eta q(p)$, where $\eta$ is an arbitrary variable and W is a set of all possible prices of the set of prices p for the each product i;

defining a second dual function $D(\lambda)$ corresponding to the revenue function $f(p)$ and the constraint q(p), $D(\lambda)$ being defined as $D(\lambda)=\max_{p \in W} \alpha f(p)+\lambda g(p)+(\beta-\lambda)h(p)$, where $\alpha$, $\beta$, and $\lambda$ are arbitrary variables;

identifying a set of prices $p_\eta$ of the set of prices p using data in the pricing database and a pricing algorithm satisfying $|f(p_\eta)-G(\eta)| \le \epsilon$, where $\epsilon$ is an arbitrary constraint according to an inner and outer bisection algorithm according to the revenue function $f(p)$, the first dual function $G(\eta)$, and the second dual function $D(\lambda)$, stored in the pricing database, wherein the set of prices $p_\eta$ are for the plurality of products i, wherein the inner and outer bisection algorithm is performed by running multiple concurrent instances of a MaximizeSeparable subroutine across multi-core processors in a parallel architecture, each of the multiple concurrent instances of the MaximizeSeparable subroutine comprising determining a solution of an independent convex problem using a subgradient-based inner bisection, each iteration of the inner and outer bisection algorithm comprises computation of a plurality of independent one-dimensional computations using the MaximizeSeparable subroutine to price the each product i of the plurality of products i, and each core in the multi-core processors computes one of the plurality of independent one-dimensional computations;

transmitting the set of prices $p_\eta$ to (a) a point of sale (POS) device of the one or more POS devices or (b) a product database for online e-commerce;

wherein when the set of prices $p_\eta$ are transmitted to a product database, facilitating a display, via a network, of the set of prices $p_\eta$ for the plurality of products i to electronic computing devices of users navigating the product database; and receiving transaction records for purchases of the plurality of products i as priced by the pricing algorithm.

14. The method of claim 13, further comprising defining a function MaximizeSeparable($\alpha$, $\beta$, $\lambda$, $f$, $g$, $h$) that produces as an output a solution to $\hat{p}_\lambda = \arg \max_{p \in W} \alpha f(p)+\lambda^* g(p)+(\beta-\lambda^*)h(p)$, where $\lambda^*$ is a value of $\lambda$ that is a solution to $\min_{0 \le \lambda \le \beta} \{D(\lambda)=\max_{p \in W} \alpha f(p)+\lambda g(p)+(\beta-\lambda)h(p)\}$.

15. The method of claim 14, wherein the inner and outer bisection algorithm comprises Algorithm 2 of Table 2.

16. The method of claim 13, further comprising:

transmitting the set of prices $p_\eta$ to the one or more point of sale (POS) devices; and conducting on the one or more POS devices transactions for purchase of units of the plurality of products i at corresponding prices from the set of prices $p_\eta$.

17. The method of claim 13, further comprising:

transmitting offers for sale for the plurality of products i at the set of prices $p_\eta$ to electronic computing devices of users; and conducting electronic transactions to purchase units of the plurality of products i at corresponding prices from the set of prices $p_\eta$.

18. The method of claim 13, wherein the inner and outer bisection algorithm further comprises facilitating pricing of the plurality of products i for an online retailer.

* * * * *